United States Patent
Won et al.

(10) Patent No.: US 9,167,279 B2
(45) Date of Patent: Oct. 20, 2015

(54) METHOD FOR PAYLOAD FORMATTING AND DEFORMATTING FOR BURST LOSS RECOVERY

(75) Inventors: Seok Ho Won, Daejeon (KR); Sun Hyoung Kwon, Seoul (KR); Ho Kyom Kim, Daejeon (KR); Jong Soo Lim, Daejeon (KR); O Hyung Kwon, Daejeon (KR)

(73) Assignee: ELECTRONICS & TELECOMMUNICATIONS RESEARCH INSTITUTE, Daejeon (KR)

( * ) Notice: Subject to any disclaimer, the term of this patent is extended or adjusted under 35 U.S.C. 154(b) by 498 days.

(21) Appl. No.: 13/585,745

(22) Filed: Aug. 14, 2012

(65) Prior Publication Data

US 2013/0051479 A1 Feb. 28, 2013

(30) Foreign Application Priority Data

Aug. 22, 2011 (KR) .................. 10-2011-0083505
Apr. 5, 2012 (KR) .................. 10-2012-0035202

(51) Int. Cl.
*H04N 7/26* (2006.01)
*H04N 21/2343* (2011.01)
*H04N 21/2383* (2011.01)
*H04N 21/438* (2011.01)

(52) U.S. Cl.
CPC ... *H04N 21/234327* (2013.01); *H04N 21/2383* (2013.01); *H04N 21/4382* (2013.01)

(58) Field of Classification Search
CPC .............. H04N 21/234327; H04N 21/2383; H04N 21/4382; H04N 21/440227
USPC ........................................ 375/240.26, 240.27
See application file for complete search history.

(56) References Cited

U.S. PATENT DOCUMENTS

| | | | |
|---|---|---|---|
| 6,421,387 B1 | 7/2002 | Rhee | |
| 2009/0213728 A1 | 8/2009 | Chang et al. | |
| 2009/0310674 A1* | 12/2009 | Le Leannec et al. | 375/240.12 |
| 2011/0055666 A1 | 3/2011 | Hedaoo et al. | |
| 2012/0131407 A1* | 5/2012 | Chiao et al. | 714/751 |

FOREIGN PATENT DOCUMENTS

KR  1020040044218 A  5/2004

* cited by examiner

*Primary Examiner* — Andy Rao
*Assistant Examiner* — Obafemi Sosanya

(57) ABSTRACT

Disclosed are payload formatting and deformatting methods for burst data loss recovery. The payload formatting method according to an embodiment of the present invention includes: generating an XOR operation packet by performing an XOR operation on the basis of a base layer packet and any one of enhancement layer packets of a group of pictures (GoP), the GoP including the base layer packet and the enhancement layer packets; and adding the XOR operation packet to the GoP.

13 Claims, 4 Drawing Sheets

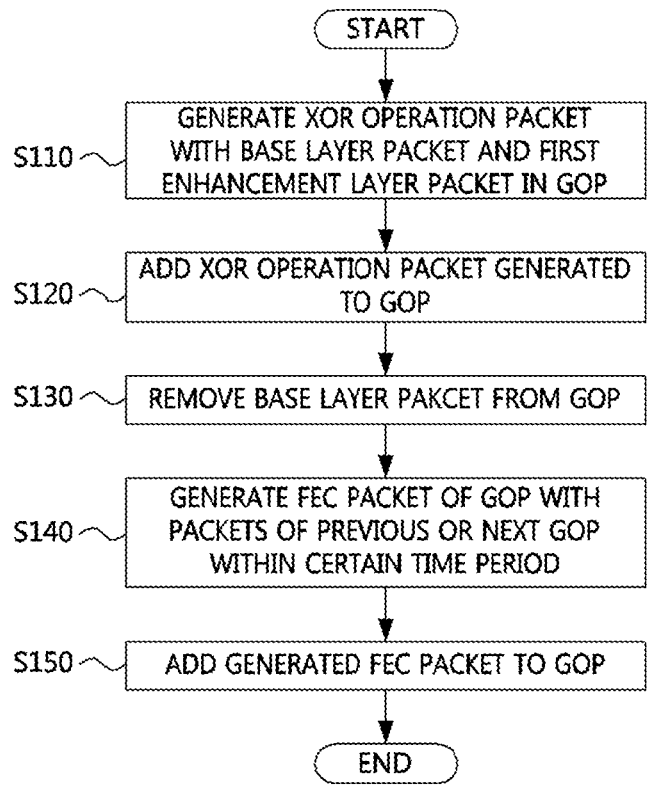
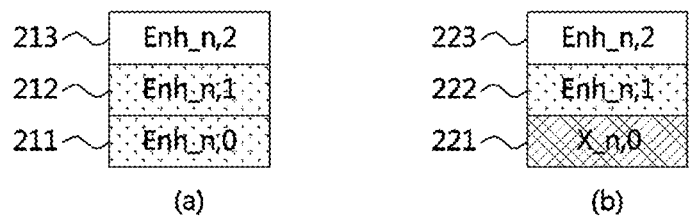
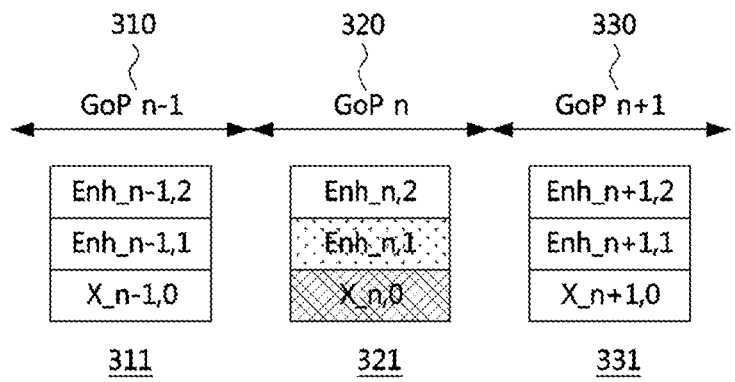

METHOD FOR PAYLOAD FORMATTING AND DEFORMATTING FOR BURST LOSS RECOVERY

CLAIM FOR PRIORITY

This application claims priority to Korean Patent Application No. 10-2011-0083505 filed on Aug. 22, 2011 and No. 10-2012-0035202 filed on Apr. 5, 2012 in the Korean Intellectual Property Office (KIPO), the entire contents of which are hereby incorporated by reference.

BACKGROUND

1. Technical Field

Example embodiments of the present invention relate in general to data loss recovery in a communication system and more specifically to payload formatting and deformatting methods for recovering errors and losses which occur during multimedia data transmission.

2. Related Art

In view of characteristics of a mobile communication service environment, terminals may not receive data when they pass through a shaded area such as a back side of a building or an inside of a tunnel. Accordingly, there is a situation in which a burst loss may not be avoided. In this case, a method of constructing a forward error correction (FEC) packet in a payload is used to recover the loss.

FEC is a technology for recovering an error at a data receiving side, which is used to protect data from corruption. Many communication systems have one-way channels without backward channels and thus cannot request retransmission. The communication systems have a delay time even if the retransmission is allowed. Thus, the data receiving side uses FEC to actively correct errors that occur during transmission.

However, an existing payload format, which uses FEC having a function for recovering the burst loss, has a problem in that a transmission bandwidth is greater when a channel condition is good, but the losses cannot be perfectly recovered when errors have collectively occurred in a group of data.

SUMMARY

Accordingly, example embodiments of the present invention are provided to substantially obviate one or more problems due to limitations and disadvantages of the related art.

Example embodiments of the present invention provide a payload formatting method for effectively recovering a burst loss without retransmission.

Example embodiments of the present invention also provide a payload deformatting method for effectively recovering a burst loss without retransmission.

In some example embodiment, a payload formatting method performed by a transmitter includes: generating an XOR operation packet by performing an XOR operation on the basis of a base layer packet and any one of the enhancement layer packets of a group of picture (GoP) including the base layer packet and the enhancement layer packets; and adding the XOR operation packet to the GoP.

The payload formatting method may further include removing the base layer packet from the GoP.

The base layer packet may be associated with a most important frame in the GoP, and the enhancement layer packet used in the XOR operation may be associated with a second most important frame in the GoP.

The payload formatting method may further include: generating a forward error correction (FEC) packet of the GoP by adding a base layer packet of a previous or next GoP at a predetermined time period from the GoP and performing FEC encoding; and adding the generated FEC packet to the GoP.

The payload formatting method may further include: generating a forward error correction (FEC) packet of the GoP by adding a base layer packet of a previous or next GoP at a predetermined time period from the GoP and performing FEC encoding; and adding the generated FEC packet to the GoP.

In other example embodiments, a payload deformatting method performed by a receiver includes: receiving packets of a group of picture (GoP) including an XOR packet generated by performing XOR operation on the basis of a base layer packet and a first enhancement layer packet, at least one enhancement layer packet including the first enhancement layer packet, and FEC packet; checking whether the packets of the GoP are lost; and if no packet is lost or a packet other than the first enhancement layer packet and the XOR packet is lost, restoring (first step) the base layer packet of the GoP by performing XOR operation on the basis of the XOR packet and the first enhancement layer packet.

The FEC packet of the GoP may be generated by adding a base layer packet of a previous or next GoP at a predetermined time period from the GoP and performing FEC encoding.

The payload deformatting method may further include: receiving and storing the packets of the GoP in a buffer, the buffer storing packets of all previous and next GoPs within a predetermined time period from the GoP.

The payload deformatting method may further include restoring the base layer packet of the GoP by performing FEC decoding on the basis of packets of a previous GoP at a predetermined time period from the GoP when the first enhancement layer packet or the XOR packet is determined to be lost as a result of the checking.

The restoring of the base layer packet of the GoP may include using the packets of the previous GoP at a predetermined time period, which is stored in the buffer.

The payload deformatting method may further include restoring (third step) the base layer packet of the GoP by performing FEC decoding on packets of a next GoP at a predetermined time period from the GoP when the first enhancement layer packet or the XOR packet is determined to be lost as a result of the checking.

BRIEF DESCRIPTION OF DRAWINGS

Example embodiments of the present invention will become more apparent by describing in detail example embodiments of the present invention with reference to the accompanying drawings, in which:

FIG. 1 is a flowchart illustrating a payload formatting process for burst loss recovery according to an embodiment of the present invention;

FIG. 2 is a block diagram showing a scalable video data structure and a payload structure which is reconstructed using an XOR operation according to an embodiment of the present invention;

FIG. 3 is a block diagram showing packets of the GoP for each time period, which is constructed according to the payload structure of an embodiment of the present invention;

DESCRIPTION OF EXAMPLE EMBODIMENTS

Figure 4:
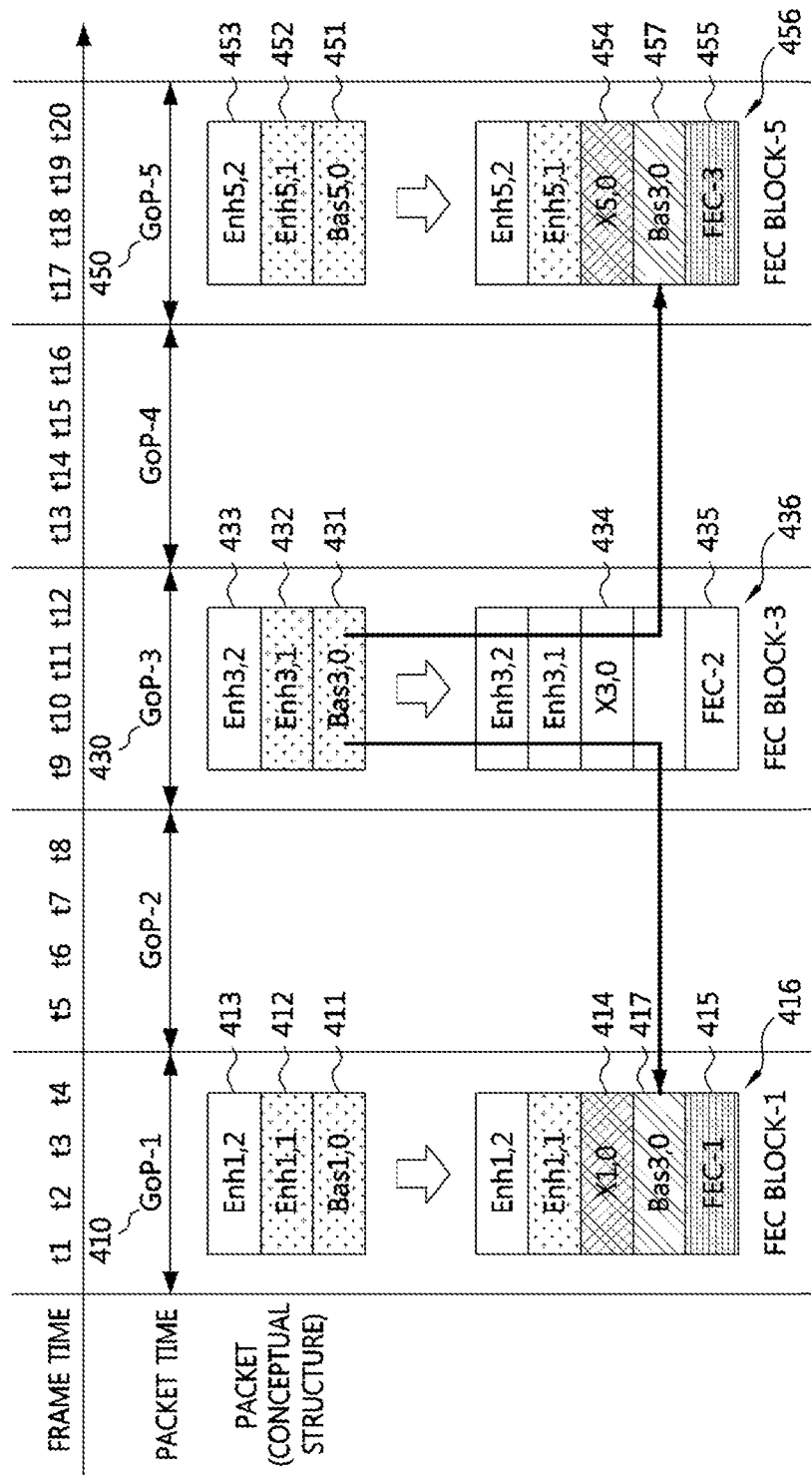
FIG. 4 is a block diagram showing an FEC encoding method and a payload formatting method for burst loss recovery according to an embodiment of the present invention.

The invention may have diverse modified embodiments, and thus, example embodiments are illustrated in the drawings and are described in the detailed description of the invention. However, this does not limit the invention within specific embodiments and it should be understood that the invention covers all the modifications, equivalents, and replacements within the idea and technical scope of the invention. Like numbers refer to like elements throughout the description of the figures.

It will be understood that, although the terms first, second, A, B, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, example embodiments of the invention will be described in detail with reference to the accompanying drawings. In describing the invention, to facilitate the entire understanding of the invention, like numbers refer to like elements throughout the description of the figures, and a repetitive description on the same element is not provided.

Payload formatting and deformatting methods for burst loss recovery according to the present invention will be disclosed below. The present invention provides a method of providing seamless service by recovering a lost packet without retransmission and, even if all packets are lost, recovering base layer packet data which is the most important data. This is implemented as a combination of an error correction technique and a payload formatting technique, which enables coding gain and loss compensation at high efficiency.

FIG. 1 is a flowchart illustrating a payload formatting process for burst loss recovery according to an embodiment of the present invention.

Referring to FIG. 1, the payload formatting process for burst loss recovery according to an embodiment of the present invention, which may be performed at a data transmitter, may include an XOR operation packet generation step S110, an XOR operation packet addition step S120, a base layer packet removal step S130, an FEC packet generation step S140, and an FEC packet addition step S150.

Also, referring to FIG. 1, the steps involved in the payload formatting process for burst loss recovery according to an embodiment of the present invention may be described as follows.

The XOR operation packet generation step S110 may include generating an XOR operation packet by performing an XOR operation on a group of pictures (GoP) including a base layer packet and one or more enhancement layer packets, on the basis of the base layer packet and the most important enhancement layer packet of the enhancement layer packets of the GoP.

The XOR operation packet generated in the XOR operation packet generation step S110 is added to the GoP (S120), and the base layer packet is removed from the GoP (S130). Thereafter, the packets of the GoP may be transmitted.

An exemplary structure of the XOR operation packet in a scalable video data structure will be described below with reference to drawings.

FIG. 2 is a block diagram showing a scalable video data structure and a payload structure which is reconstructed using the XOR operation according to an embodiment of the present invention.

Referring to FIG. 2A, the scalable video data may include a base layer packet (Base_n, 0) 211, a first enhancement layer packet (Enh_n, 1) 212, and a second enhancement layer packet (Enh_n, 2) 213.

Also, in the base layer packet (Base_n, 0) 211, n may be a time index indicating the $n^{th}$ GoP, and 0 may be an index indicating the highest importance. Like this, the base layer packet may refer to the most important packet or frame in an actual video coding data group.

For example, in H.264/AVC, one GoP may include one instantaneous decoding refresh (IDR) frame (I frame), which is the most important, and a plurality of P frames and B frames. In this case, the base layer packet (Base_n, 0) 211 may indicate the IDR frame. Also, in H.264/SVC, one GoP may include the base layer and at least one enhancement layer, and each layer has I, P, and B frames. In this case, the base layer packet (Base_n, 0) 211 may refer to all the frames of the base layer or only the I frame from among the I, P, and B frames of the base layer. Also, in the first enhancement layer packet (Enh_n, 1) 212, n may be a time index, and 1 may be an index indicating the second highest importance.

Referring to FIG. 2B, which shows the payload structure which is reconstructed using the XOR operation according to an embodiment of the present invention, one GoP may include an XOR operation packet (X_n, 0) 221, a first enhancement layer packet (Enh_n, 1) 222, and a second enhancement layer packet (Enh_n, 2) 223.

In this case, the XOR operation packet (X_n, 0) 221 is a new packet generated by performing the XOR operation on the base layer packet (Base_n, 0) 211 bit by bit and the first enhancement layer packet (Enh_n, 1) 212 of FIG. 2A, which may be expressed as Equation (1).

$$\{X\_3,0\}=\{Base\_3,0\}XOR\{Enh\_3,1\} \quad \text{Equation (1)}$$

where { } represents a bit-wise operation.

Accordingly, if either of Base_3, 0 and Enh_3, 1 is not lost, the other may be recovered using X_3, 0 which is a result of Equation (1).

FIG. 3 is a block diagram showing packets of the GoP for each time period, which is constructed according to the payload structure of an embodiment of the present invention.

Referring to FIG. 3, XOR packets 311, 321, and 331 may be generated by performing the XOR operation on the basis of the base layer packets and the enhancement layer packets of GoPs 310, 320, and 330 according to an embodiment of the present invention, and added to the GoPs 310, 320. Then the packets of GoPs may be transmitted. In this case, the base layer packets are removed from the GoPs, and the packets of the GoPs may be transmitted.

The FEC packet generation step S140 may include generating an FEC packet for the GoP by adding the base layer packet of a previous or next GoP at a predetermined time period from the GoP and performing FEC encoding on the basis of an FEC source block. In this case, the XOR operation may be used in the FEC encoding.

The generated FEC packet may be added to the GoP (S150) and then the packets of the GoP may be transmitted. Also, at this time, the base layer packet of the previous or next GoP which has been added during the FEC encoding may be removed from the GoP and then the packets of the GoP may be transmitted.

A structure and a payload format of the above-described FEC packet will be described below.

FIG. 4 is a block diagram showing an FEC encoding method and a payload formatting method for burst loss recovery according to an embodiment of the present invention.

Referring to FIG. 4, it may be assumed that the video data of GoPs may include base layer packets 411, 431, and 451, first enhancement layer packets 412, 432, and 452, and second enhancement layer packets 413, 433, and 453. For example and without limitation, the FEC source block may be generated for each GoP. Also, a maximum protection time period L for burst loss recovery is set as 2 GoPs, which may change depending on the design.

To protect low speed data such as in an SVC base layer, the FEC data may be generated after calling and adding data at the time period L to a current source block as a redundancy.

For example, a new XOR packet (X3, 0) 434 may be generated by performing the XOR operation on a base layer packet (Base3, 0) 431 and the first enhancement layer packet (Enh3, 1) 432 in the GoP-3 430.

The base layer packet (Base3, 0) 431 may be inserted into a previous FEC block-1 416 of a GoP-1 410 to generate FEC-1 415 as calculated using Equation (2).

$$FEC\text{-}1=f\{Base\_3,0,X\_1,0,Enh\_1,1,Enh\_1,2\} \quad \text{Equation (2)}$$

where f{ } may be defined as an encoding function for creating a parity of the FEC for recovering a lost bit when data packets indicated by parameters are partially lost at a reception end during transmission/reception.

For example, in systematic Reed-Solomon code or systematic Raptor code, information bits may correspond to packet data groups indicated by the parameters of function f{ }, an encoding process may correspond to a function of function f{ }, and a packet constructed with the generated redundancy parity may correspond to the FEC-1 415.

Also, in the FEC corresponding to the next FEC block-5 456, an FEC-3 455 may be generated as calculated using Equation (3).

$$FEC\text{-}3=f\{Base\_3,0,X\_5,0,Enh\_5,1,Enh\_5,2\} \quad \text{Equation (3)}$$

Similarly, in order to protect against burst loss for time period 2L, the two methods may be used together if necessary. Herein, the base layer packets (Base3, 0) 417 and 458 added as a redundancy may be used only for FEC calculation and removed when the video frames (packets) and FEC data are transmitted. Accordingly, the method according to the present invention does not increase a data transfer rate. An FEC coding rate may increase slightly because of the inserted base layer packet, but may decrease significantly because of an XOR coding and a burst loss recovery rate.

Figure 5:
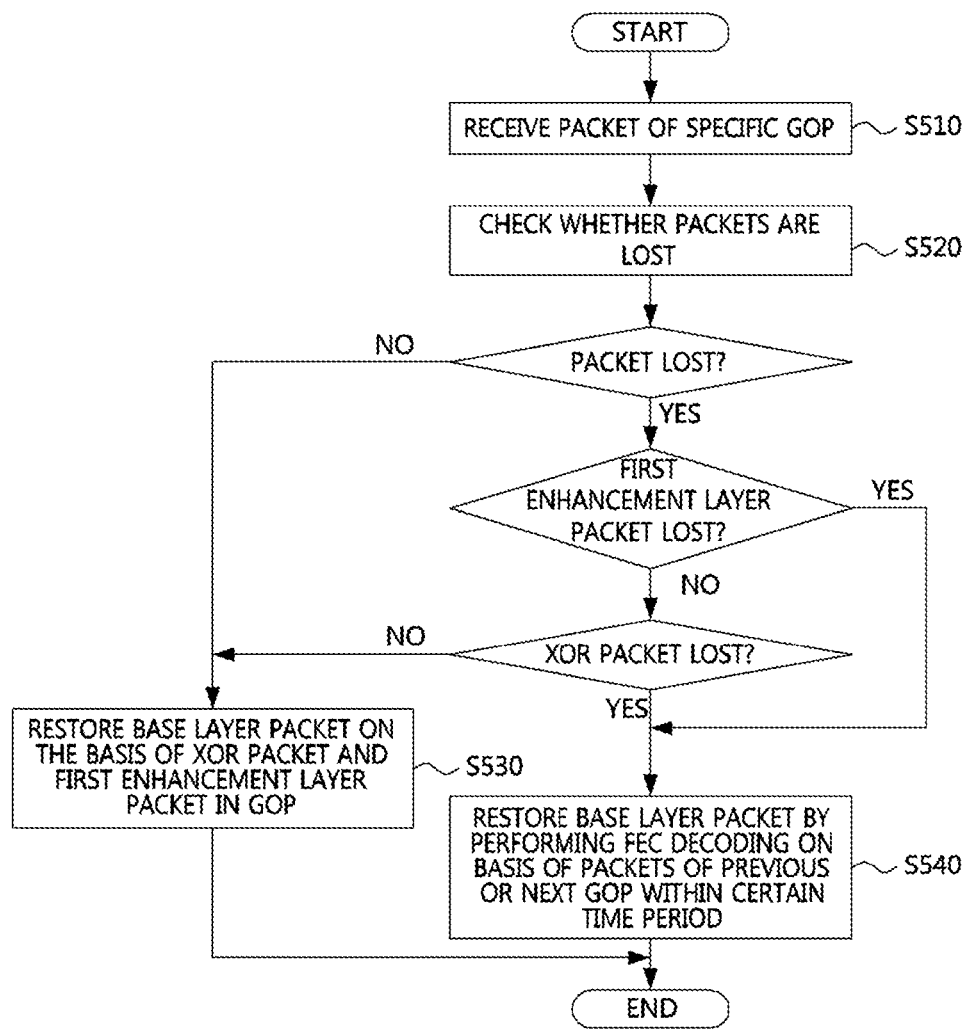
FIG. 5 is a flowchart illustrating a payload deformatting process for burst loss recovery according to an embodiment of the present invention.

FIG. 5 is a flow chart illustrating a payload deformatting process for burst loss recovery according to an embodiment of the present invention.

Referring to FIG. 5, the payload deformatting process for burst loss recovery according to an embodiment of the present invention may include a packet reception step S510, a packet loss check step S520, a base layer packet restoration step S530 using an XOR packet, and a base layer packet restoration step S540 using an FEC decoding.

Also, steps involved in the payload deformatting process for burst loss recovery according to an embodiment of the present invention may be described as follows.

The packet reception step S510 may include receiving packets of one GoP of multimedia data. For example, the GoP is constructed according to the payload formatting method of the present invention. That is, the GoP may include an XOR packet generated on the basis of the base layer packet and the first enhancement layer packet, at least one enhancement packet, and an FEC packet.

The packet loss check step S520 may include checking whether all or a portion of the received packets in the GoP are lost during transmission. If the packet is lost, the deformatting method may vary depending on which packet is lost.

For example, if the packet is not lost, the base layer packet may be restored by performing the XOR operation on the basis of the XOR packet and the first enhancement layer packet of the GoP (S530). Accordingly, data may be reproduced using all data packets of the GoP, in addition to the restored base layer packet.

Also, if the lost packet is not the first enhancement layer packet or the XOR packet but the second enhancement layer packet, the base layer packet may be restored by performing the XOR operation on the basis of the XOR packet and the first enhancement layer as describe above (S530). In this case, even though the second enhancement layer packet is lost, data may be reproduced using both the base layer packet, which is the most important data, and the first enhancement layer packet.

If the first enhancement layer packet or the XOR packet is lost, the base layer packet of the GoP may be restored by performing the FEC decoding on packets of a previous or next GoP at a predetermined time period from the GoP (S540). It may be determined whether the FEC decoding is performed on the packet of the previous or next GoP according to the FEC encoding method which is performed in a transmitter. For example, if the transmitter further performs FEC encoding on the base packet of a 2L previous GoP, a receiver may perform FEC decoding using a packet of a 2L next GoP in order to restore the base packet.

The payload deformatting method according to the present invention will be described below in more detail with reference to drawings.

Figure 6:
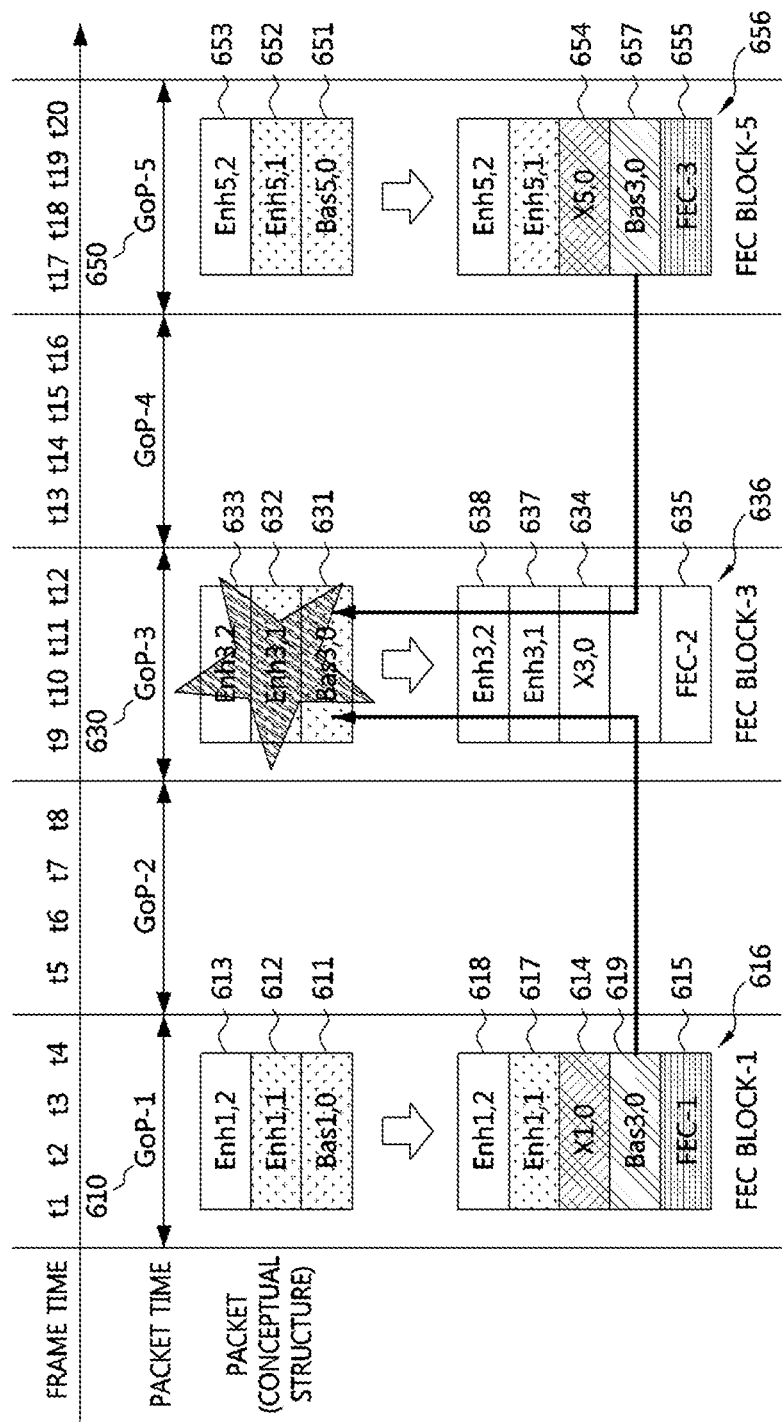
FIG. 6 is a block diagram showing an FEC decoding method and a payload deformatting method for burst loss recovery according to an embodiment of the present invention.

FIG. 6 is a block diagram showing an FEC decoding method and a payload deformatting method for burst loss recovery according to an embodiment of the present invention.

Referring to FIG. 6, a recovery process is shown when a burst loss occurs in GoP-3 630. In this case, it is assumed that a buffer storage time period of a video frame is greater than time period L. 2L should be stored when both the previous GoP and the next GoP is used.

1) Case in which No Packet is Lost

If no packet is lost in the GoP-3 630, the base layer packet Base_3, 0 may be found by performing a bit-wise XOR operation on the XOR packet (X3, 0) 634 and the first enhancement layer packet (Enh_3, 1) 637 of the FEC block-3 636, using Equation (4).

$$\{Base\_3,0\}=\{X\_3,0\}XOR\{Enh\_3,1\} \quad \text{Equation (4)}$$

where { } represents a bit-wise operation.

The GoP having the base layer packet found through Equation (4), the first enhancement packet (Enh_3, 1) 637, and the second enhancement packet (Enh_3, 2) 638 may be displayed.

2) Case in which the Second Enhancement Layer Packet is Lost

If the second enhancement layer packet (Enh_3, 2) 633 is lost in the GoP-3 630, the base layer packet Base_3, 0 may be found by performing a bit-wise XOR operation on the XOR packet (X3, 0) 634 and the first enhancement layer packet (Enh_3, 1) 637 of the FEC block-3 636, using Equation (4).

The GoP having the base layer packet found through Equation (4) and the first enhancement packet (Enh_3, 1) 637 other than the second enhancement packet (Enh_3, 2) 638 may be displayed.

3) Case in which the First Enhancement Layer Packet is Lost

When the first enhancement layer packet (Enh3, 1) 632 in the GoP-3 630 is lost, the base layer packet cannot be found from the XOR packet (X3, 0) 634. Accordingly, an FEC packet (FEC-1) 615 in the GoP-1 610 may be used, which is encoded in addition to the base layer packet of the GoP-3 630.

That is, the FEC block-1 616 may be generated from a buffer and include packets of Base3, 0. Therefore, the packets of Base3, 0 are found using equation (5).

$$Base\_3,0=\{X\_1,0,Enh\_1,1,Enh\_1,2,FEC-1\} \quad \text{Equation (5)}$$

where an inverse function { } of f may be an FEC decoding process for restoring a data bit string, by using data packets indicated by parameters in the { }, such as the XOR packet (X1, 0) 614, the first enhancement layer packet (Ehn1, 1) 617, the second enhancement layer packet (Ehn1, 2) 618, and the FEC packet (FEC-1) 615 in the FEC block-1 616.

Accordingly, the lost first enhancement layer packet (Enh_3, 1) 632 may be found as calculated in Equation (6), using the base layer packet (Base_3, 0) 619 and the XOR packet (Enh_3, 1) 634 found with Equation (5).

$$\{Enh\_3,1\}=\{X\_3,0\}XOR\{Base\_3,0\} \quad \text{Equation (6)}$$

Also, when the next GoP time period 650 is used, the same operation as described above may be performed after waiting until the FEC block-5 656 can be generated.

The GoP having the base layer packet (Base_3, 0) 619 found through Equation (5), the first enhancement packet (Enh_3, 1) 637 found through Equation (6), and the second enhancement packet (Enh_3, 2) 638 may be displayed.

4) Case in which the XOR Packet is Lost

When the XOR packet (Enh3, 1) 634 is lost in the GoP-3 630, like the case in which the first enhancement layer packet is lost as described above, the FEC packet (FEC-1) 615 in the GoP-1 610 may be used to find the base layer packet.

That is, the first enhancement packet (Enh_3, 1) 637 and the second enhancement packet (Enh_3, 2) 638 which are not lost, and the base layer packet (Base_3, 0) 619 found using Equation (5) may be displayed.

5) Case in which all Packets are Lost

When all of the packets are lost in the GoP-3 630, the FEC block-1 616 may be generated from a buffer and then the base layer packet (Base_3, 0) 619 may be found using Equation (5).

The base layer packet may be displayed.

As described above, it is possible to restore the most important base layer packet even if all packets are lost.

It is possible to enhance performance by the XOR coding gain by using the payload formatting and deformatting methods for burst data loss recovery according to the present invention, which perform the FEC coding with the XOR operation. According to exemplary embodiments of the present invention, it is also possible to provide a function of unequal error protection (UEP) for mainly performing the XOR coding on important data such as base layer data or first enhancement layer data to make it robust against loss.

According to exemplary embodiment of the present invention, it is also possible to provide seamless service by providing a method of adding the most important data portion of a specific GoP when FEC of a previous or next GoP is calculated and thus recovering the most important data even when all data in the specific GoP section is lost.

While the example embodiments of the present invention and their advantages have been described in detail, it should be understood that various changes, substitutions and alterations may be made herein without departing from the scope of the invention.

What is claimed is:

1. A payload formatting method performed by a transmitter, comprising:
generating an XOR operation packet by performing an XOR operation on the basis of a first base layer packet of a first Group of Pictures (GoP) and an enhancement layer packet of the first GoP;
inserting the XOR operation packet and the enhancement layer packet into a Forward Error Correction (FEC) block;
generating an FEC packet using a second base layer packet of a second GoP; and
inserting the FEC packet into the FEC block,
wherein the first GoP includes packets of a first time period,
wherein the second GoP includes packets of a second time period,
wherein the second time period is before or after the first time period, and
wherein the first time period precedes or follows the second time period by a predetermined protection time period.

2. The payload formatting method of claim 1, wherein the first base layer packet is not inserted into the FEC block.

3. The payload formatting method of claim 1, wherein the first base layer packet is associated with a most important frame in the first GoP, and the enhancement layer packet is associated with a second most important frame in the GoP.

4. The payload formatting method of claim 1, wherein the FEC packet is a first FEC packet, the method further comprising:
generating a second FEC packet using a third base layer packet of a third GoP; and
adding the second FEC packet to the FEC block.

5. The payload formatting method of claim 1, further comprising inserting the second base layer packet of the second GoP into the FEC block.

6. The payload formatting method of claim 1, wherein generating the FEC packet includes performing the XOR operation.

7. A payload deformatting method performed by a receiver, comprising:
- receiving a plurality of packets of a first Forward Error Correction (FEC) block associated with a first group of pictures (GoP);
- determining whether the received packets of the first FEC block include an enhancement layer packet and an XOR packet, respectively;
- when the received packets of the first FEC block include the enhancement layer packet of the first GoP and the XOR packet, restoring a base layer packet of the first GoP by performing an exclusive-or (XOR) operation on the basis of the XOR packet and the enhancement layer packet; and
- when the received packets of the first FEC block do not include one or more of the enhancement layer packet and the XOR packet, receiving a plurality of packets of a second FEC block associated with a second GoP, and restoring the base layer packet of the first GoP using a received packet of the second FEC block,
- wherein the first GoP includes packets of a first time period,
- wherein the second GoP includes packets of a second time period,
- wherein the second time period is before or after the first time period, and
- wherein the first time period precedes or follows the second time period by a predetermined protection time period.

8. The payload deformatting method of claim 7, wherein the received packets of the second FEC block include an FEC packet generated by performing FEC encoding using a base layer packet of the first GoP.

9. The payload deformatting method of claim 7, further comprising:
- receiving and storing the packets of the first GoP in a buffer, the buffer being configured to store packets of all previous and next FEC blocks within a predetermined time period from the first FEC block.

10. The payload deformatting method of claim 8, further comprising when the received packets of the first FEC block do not include one or more of the enhancement layer packet and the XOR packet, restoring the base layer packet of the first GoP using the FEC packet of the second FEC block.

11. The payload deformatting method of claim 10, wherein restoring the base layer packet of the first GoP comprises performing FEC decoding using the FEC packet and at least one packet of the second GoP.

12. The payload deformatting method of claim 7, wherein the base layer packet is associated with a most important frame in the first GoP, and the first enhancement layer packet is associated with a second most important frame in the first GoP.

13. The payload deformatting method of claim 7, wherein the packets of the second FEC block include the base layer packet of the first GoP.

* * * * *